(12) United States Patent
Bogorad et al.

(10) Patent No.: US 8,667,587 B1
(45) Date of Patent: *Mar. 4, 2014

(54) REAL-TIME WEBSITE SAFETY REPUTATION SYSTEM

(75) Inventors: Walter Bogorad, Danville, CA (US); Vadim Antonov, Belmont, CA (US)

(73) Assignee: Symantec Operating Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/474,973

(22) Filed: May 18, 2012

Related U.S. Application Data

(63) Continuation of application No. 12/059,471, filed on Mar. 31, 2008, now Pat. No. 8,185,956.

(51) Int. Cl.
*G06F 11/00* (2006.01)
*G06F 12/14* (2006.01)
*G06F 12/16* (2006.01)
*G06F 15/173* (2006.01)

(52) U.S. Cl.
USPC ............ 726/22; 709/223; 709/224; 709/225; 726/23; 726/24; 726/25; 726/26

(58) Field of Classification Search
None
See application file for complete search history.

(56) References Cited

U.S. PATENT DOCUMENTS

| | | | | |
|---|---|---|---|---|
| 7,734,609 | B2 * | 6/2010 | Manfredi et al. | 707/705 |
| 2006/0253583 | A1 * | 11/2006 | Dixon et al. | 709/225 |
| 2006/0253584 | A1 * | 11/2006 | Dixon et al. | 709/225 |
| 2008/0082662 | A1 * | 4/2008 | Dandliker et al. | 709/225 |

* cited by examiner

*Primary Examiner* — Nathan Flynn
*Assistant Examiner* — Trang Doan
(74) *Attorney, Agent, or Firm* — Campbell Stephenson LLP

(57) ABSTRACT

A mechanism is provided for determining a safety reputation for a network site in a manner that provides both wide coverage of potentially malicious sites as well as improves the freshness of information from which the safety reputation is derived. Community-based information, such as reports from users related to recently-visited network sites, malware detected by reporting network nodes, non-specific information such as unusual CPU usage and network activity of visiting nodes, and information received from other types of external feeds is used in determining the safety reputation and updating the safety reputation. Such information is analyzed in order to determine network sites that are potential sources of malware, which can then be subjected to more detailed analysis. Historical information as to a site's reputation and other factors such as commercial importance can also be reviewed to make a determination as to whether information being currently gathered by a community of users is sufficient to trigger additional analysis of the network site. Thus, resources used for detailed analysis of suspect network sites is conserved.

20 Claims, 5 Drawing Sheets

REAL-TIME WEBSITE SAFETY REPUTATION SYSTEM

CROSS-REFERENCE TO RELATED APPLICATIONS

The present patent application is a continuation of U.S. patent application Ser. No. 12/059,471, filed on Mar. 31, 2008, entitled "Real-Time Website Safety Reputation System", now U.S. Pat. No. 8,185,956, which issued on May 22, 2012, and is incorporated by reference herein in its entirety and for all purposes.

FIELD OF THE INVENTION

The present invention relates to the field of computer security, and particularly to a system and method for using community-based information to detect potential sources of malware and to make a determination to subject those potential sources to further analysis.

BACKGROUND OF THE INVENTION

Wide area networks such as the Internet provide an ever-increasing community of users with a similarly increasing number of accessible network sites from which those users can gather information, applications, and entertainment. Such an open community also provides opportunity for malicious users and sites to spread malicious software (malware) such as viruses, worms, and the like. In order to protect users from such malicious activity, protection schemes have been devised to alert users to the presence of malware on their computers and to cleanse affected computers from malware.

In the past, computer protection schemes have been limited to reacting to the presence of malware on an affected computer. That is, once the presence of malware on a computer had been detected, only then could security software react to the malware and remove it from the computer. In order to proactively protect users' computers, a mechanism for warning users as to the presence of malware on a site that a user intends to visit is desirable. But in order to provide information as to the safety of a network site, a provider of such information has typically had to visit the network site and subject the site to analysis. Thorough security analysis of a network site can involve visiting every page of a site and subjecting each page to multiple levels of analysis.

As the number of available network sites increases, the task of visiting each one of those sites and analyzing each page of each of those sites becomes so resource intensive as to be impractical. Further, to the degree that sites are visited and analyzed, those sites can only be subjected to analysis at longer and longer intervals due to the number of other sites requiring analysis. Thus, issues arise with regard to the freshness of the information gained from analyzing a particular website.

It is therefore desirable to implement a network site analysis system that allows both broad coverage of malicious or potentially malicious network sites, as well as providing for reasonably fresh information upon which a user can decide whether to visit a specific network site. It is further desirable that such a system take into account limitations on the availability of network site analysis resources in deciding whether to subject a specific site to detailed analysis.

SUMMARY OF THE INVENTION

A mechanism is provided for determining a safety reputation for a network site in a manner that provides both wide coverage of potentially malicious sites as well as improves the freshness of information from which the safety reputation is derived. Community-based information, such as reports from users related to recently-visited network sites, malware detected by reporting network nodes, non-specific information such as unusual CPU usage and network activity of visiting nodes, and information received from other types of external feeds is used in determining the safety reputation and updating the safety reputation. Such information is analyzed in order to determine network sites that are potential sources of malware, which can then be subjected to more detailed analysis. Historical information as to a site's reputation and other factors such as commercial importance can also be reviewed to make a determination as to whether information being currently gathered by a community of users is sufficient to trigger additional analysis of the network site. Thus, resources used for detailed analysis of suspect network sites is conserved.

An embodiment of the present invention can perform the above-described determining of safety reputation for a network site by receiving information related to the safety of the network site from one or more sources, this information is then used to identify a suspect network site. Once a suspect network site is identified, a probability that a previously determined safety rating for that site will change due to a security analysis of the suspect network site is calculated using the previously determined safety rating and the received information regarding the site. In response to the probability that the safety rating will change, the suspect network site can be submitted for a detailed security analysis and the results of that security analysis can be stored.

An aspect of the present invention provides for the information received from a source to be a history of network sites visited by that source and a result of a security scan of the source indicative of a presence of malicious software, such as the identification of the malicious software or an indication that a dynamic parameter associated with the source exceeds a predetermined threshold. A further aspect of the present invention provides for identifying the suspect network set by analyzing the security scans from each source network node to identify the presence of a common malicious software among a subset of the source network nodes, analyzing the history of recently visited network sites by each of the source network nodes to identify a commonly visited site, and if there is one, identifying that commonly visited network site as a suspect network site.

Another aspect of the present invention provides that the sources of information be a combination of trusted and untrusted network nodes. An additional aspect of the present invention provides for determining the probability that the previously determined safety rating will change to include calculating a decayed safety rating comprising a time-dependant decay in accuracy of the previously determined safety rating for the suspect network site, and applying a statistical analysis to the received information related to the suspect network site and the decayed safety rating to determine a probability that the previously determined safety rating for the suspect network site will change upon further security analysis. A further aspect of the present invention provides that this statistical analysis is performed using Bayesian techniques.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a mechanism for determining a safety reputation for a network site in a manner that provides both wide coverage of potentially malicious sites as well as improves the freshness of information from which the safety reputation is derived. Embodiments of the present invention provide such functionality through the use of community-based information, such as reports from users related to recently-visited network sites, malware detected by reporting network nodes, non-specific information such as unusual CPU usage and network activity of visiting nodes, and information received from other types of external feeds. Embodiments of the present invention analyze such information in order to determine network sites that are potential sources of malware, which can then be subjected to more detailed analysis. Embodiments of the present invention can thereby be reactive to network sites that are being reported by the community of users as potential sources of malware. Embodiments of the present invention can further use historical information as to a site's reputation and other factors such as commercial importance in order to make a determination as to whether information being currently gathered by a community of users is sufficient to trigger additional analysis of the network site. In this manner, embodiments of the present invention can also conserve resources used for detailed analysis of suspect network sites.

Embodiments of the present invention are intended, in part, to provide a safety rating associated with a network site in response to an indication that a user intends on visiting that site. By providing such a safety rating, it is assumed that there is a probability that the user's behavior with regard to visiting that network site will be altered based upon that rating. For example, if a safety rating indicates that a requested network site is likely not safe to visit, then the user will be less likely to visit that site. Conversely, if the safety rating indicates that the site is likely safe to visit, then the user will be more likely to visit the network site. Other factors that may go into a specific user's decision as to whether to visit the network site might include, for example, utility-related factors, such as the opportunity cost for not visiting that site. Thus, such utility-related factors can also be considered in the rating process itself.

Figure 1:
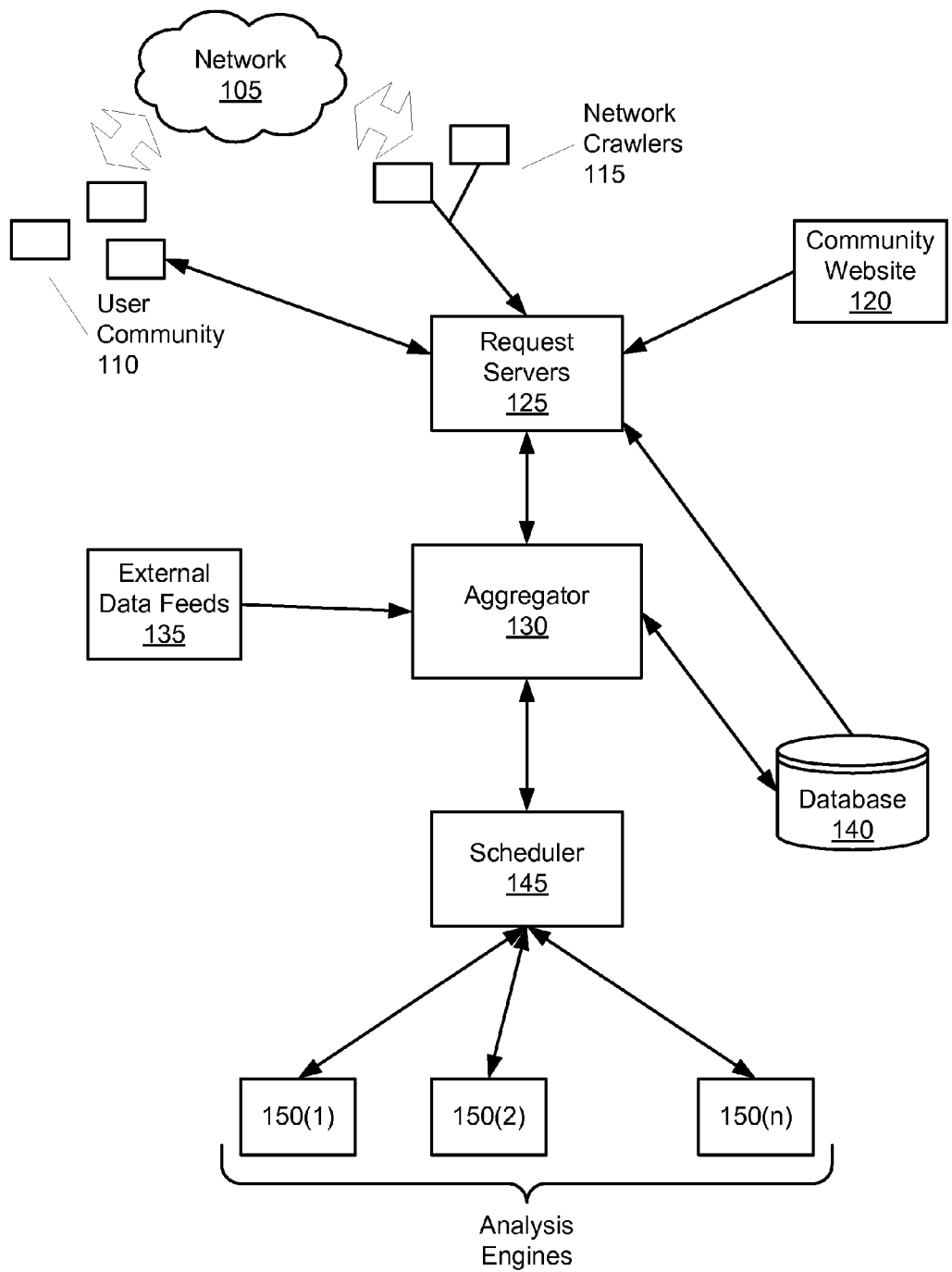
FIG. 1 is a simplified block diagram of an environment in which embodiments of the present invention may be implemented.

FIG. 1 is a simplified block diagram of an environment in which embodiments of the present invention may be implemented. One aspect of the present invention is to provide ratings of network sites located in network 105 to members of user community 110. The values for such ratings are determined, in part, from information gathered from user community 110, along with information regarding network sites gathered by network scanners, such as network crawlers 115, and information related to network sites reported through, for example, a community website 120. Information is gathered from these sources by one or more request servers 125.

Individual user nodes within user community 110 can be configured to provide a variety of information to request servers 125. For example, if a user node detects the presence of a known malware on the node, the user node can then report an identification of that malware along with a list of universal resource locaters (URLs) of recently visited network sites to the request server. Such a list can be of the last 10-20 network sites visited, for example. An assumption is made that the source of the malware is one of the recently visited network sites.

It should be appreciated that a report from a user node is from a relatively untrustworthy source. Further, standing alone, a report of the last 10-20 network sites as possible sources of a malware infection by itself is not particularly useful in narrowing down a specific source of the infection. Such shortcomings are resolved by examining reports from nodes within the user community in the aggregate. That is, if a significant number of user nodes infected by an identified malware each report having recently visited the same network site, then there is an increased probability that the identified website is the source of the infection and further investigation of that web site may be indicated.

Utilizing user node reporting in the aggregate also can address other issues related to lack of trustworthiness of the source such as, for example, potential malicious attempts to flood the reporting system with misleading data. The system can be configured such that probability that a site is bad only arises if a disparate set of sources report a potential a potential problem with a particular site.

Nodes within user community 110 can also report positive information (e.g., that contain network sites are likely not sources of malware). Request servers 125 can be configured to not only receive information from nodes in user community 110, but can also provide ratings or other information regarding a specific site in response to a request from a node in the user community. Thus, if a user node requests information about a network site and the provided information was positive, an assumption can be made that the user node ultimately visited that site. If the user node does not subsequently report a bad event happening associated with the site, then the site may be safe. Again, only in the aggregate of the activity of many user nodes can a probability of the safety of a site be assessed in light of such a click stream of user nodes.

Thus far, the user node information reported relates to infections by specific malware. That is, a user node reports when the node has detected an infection by a previously identified malware. Nodes within user community 110 can also report information is not related to a specific malware but may be indicative of other types of malware infection. This kind of non-specific information can include, for example, increased CPU usage and increased network traffic above a previously recorded baseline for the user node. Again, increases in CPU load or network traffic on an individual user node basis may not be indicative of a malware infection. But, taken in the aggregate of nodes within user community 110 along with comparisons of lists of recently visited sites, such non-specific information may be a sign that a commonly-visited site among nodes reporting the non-specific information is propagating potential malware and may need to be subject to further analysis.

Network crawlers 115 and a community reporting website 120 are additional sources of information related to network sites in network 105. Such information has varying levels of trustworthiness and can also be considered in the decision-making process of whether to subject a particular network site to further analysis. Request servers 125 gather the information from user community 110, network crawlers 115, and community websites 120 and pass that information to aggregator 130, which utilizes the gathered information along with additional information to determine a potential source of malware and whether to subject that source to further analysis. Aggregator 130 not only receives the aggregated information from web request servers 125, but also can have access to information provided by external data feeds 135 as well as historical information stored in database 140.

External data feeds 135 can include, for example, ratings provided by one or more commercial ratings services that may indicate whether a site is good in a business sense, or other such reputation data provided by external sources. External data feeds 135 can also include additional untrusted information such as information acquired from spam mailings. Many instances of spam mailings include links to network sites that contain malware. Thus, if a network site is referenced in a spam mailing, this could be an indication that the site is bad. While a propagator of spam could maliciously attack a reputation of a good site by including links to good sites in spam, since spam is an inherently untrustworthy source, information gleaned from spam would only be considered in light of information gathered from other sources. External data feeds 135 may include other externally generated indicia of network site reliability.

Database 140 stores, for example, previously generated ratings related to network sites and other historical data such as timestamps of most recent analysis and the like. This historical information can be used by aggregator 130 during the decision-making process related to whether to subject a suspect site to further analysis.

A function of aggregator 130 is to make a determination as to whether to subject a suspect network site to one or more levels of analysis by one or more of analysis engines 150(1)-(n). Analysis engines 150(1)-(n) are a limited resource in terms of the number of analysis engines, the available computing power represented by those analysis engines and available bandwidth of analysis resources. Thus, the availability of those resources is another factor to be taken into account by aggregator 130 in deciding whether to subject a suspect network site to further analysis.

Aggregator 130 performs the decision-making process as to whether to subject an identified network site to further analysis by subjecting current and historical data to a statistical analysis designed to maximize potential utility to users in user community 110. As stated above, embodiments of the present invention provide ratings to users in user community 110. Such ratings are intended to modify user behavior (e.g., a bad rating will result in users being less likely to visit a site and a good rating will result in users being more likely to visit a site). The customer population can therefore be viewed as a system that can be controlled, in the aggregate, through ratings. An estimate can be made as to aggregate customer behavior for a particular rating and thus an estimated risk of infection due to a poorly rated site can be made. Based upon that risk of infection, potential losses due to that risk can be estimated, as well as losses due to the lost opportunity incurred for not visiting a site associated with a rating. A goal, therefore, is to minimize losses due to both opportunity and risk, or in other words, maximize utility to users in the user community. A function corresponding to user utility can also take into account relative popularity of a network site or individual pages within such a site. An aggregate utility can be calculated which can include the sum of utilities for individual sites weighted by their popularity.

In determining whether to subject a suspect network site to additional analysis, aggregator 130 performs a statistical analysis to determine a probable change in utility due to results of such analysis that may be expected by users in the user community. Historical data related to the suspect network site from database 140 can be gathered, which can include rating information for each page within the site as well as corresponding times associated with the most recent analysis of those pages. The historical rating data can be viewed in light of the corresponding times of analysis in terms of a decay in the validity of the results of such analysis over time. The decayed rating value of each page in a site can then be examined in light of the new information received from the web request servers and external data feeds to determine, for example, a probability that the ratings associated with pages in a network site will change in light of that information. In light of the probabilities that new ratings could result, an expected change in utility for in users can be calculated by summing up the expected change in utilities for each page in the network site. The aggregator can then provide those sites having the highest expected utility change due to being analyzed to one or more of analysis engines 150(1)-(n) via scheduler 145.

As an example, one might expect that network sites that are historically rated as solidly good or conversely rated as solidly bad, would not be expected to have a ratings change unless a very large number of sites reported a potential problem with such a site. On the other hand, a network site having a somewhat "greyer" security rating may have a higher likelihood of a ratings change in light of a smaller number of reporting user nodes.

Aggregator 130 can use a variety of methods for making a determination as to current validity of a site's ratings and a likely change in those ratings. Embodiments of the present invention utilize a Bayesian statistical methodology to update a state of belief as to rating of a site in light of new information.

Each of analysis engines 150(1)-(n) can perform a corresponding different type of analysis. For example, a "light analysis" may involve initializing a virtual browser environment that accesses a website at a specified network site by loading all of the pages associated with that website and examining them for suspect executable code and the like. Information gathered by such "light analysis" could then be used by other analysis engines if "heavier analysis" is determined to be necessary. Such "heavier analysis" can include exercising the suspect executable code or otherwise determining a source of malware in a site along with the nature of the found malware, if any. Aggregator 130 can also make the determination as to which level of analysis a site should be subject.

Scheduler 145 receives identifying information regarding those network sites that are to be analyzed as well as the level of analysis to subject that site. The identifying information can include, for example, a network address of the site or a URL of the site or a specific web page. Scheduler 145 can then place that information in an appropriate queue corresponding to the desired level of analysis. Embodiments of the present invention can also provide for a network site to be scheduled for analysis in light of its relative expected utility change as calculated by aggregator 130. As an analysis engine 150 becomes available, the highest ranked weighting entry in a queue corresponding to that analysis engine is provided to the analysis engine for analysis.

Figure 2:
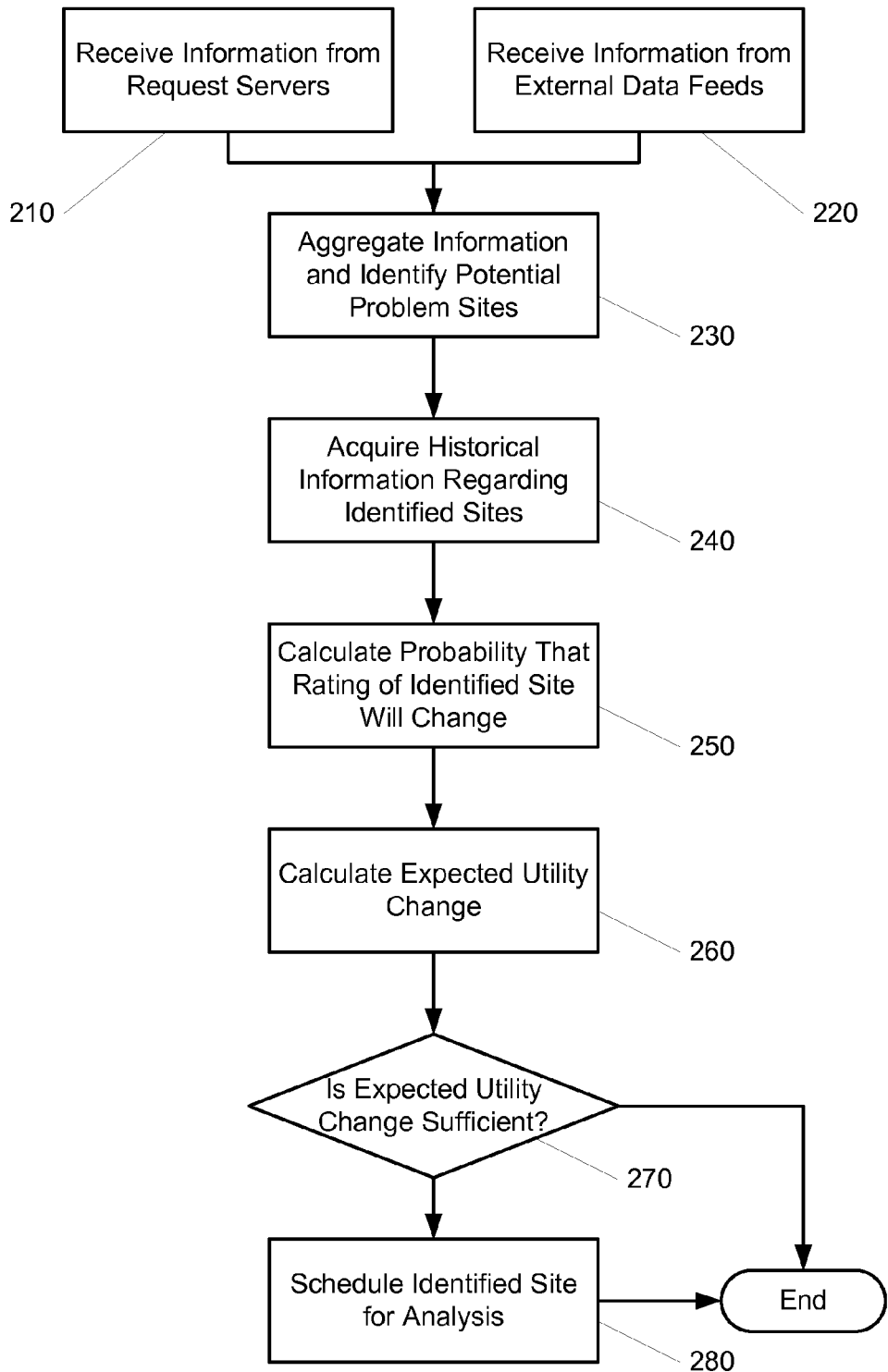
FIG. 2 is a simplified flow diagram illustrating the decision-making process performed by an aggregator in accord with embodiments of the present invention.

FIG. 2 is a simplified flow diagram illustrating the decision-making process performed by aggregator 130 in accord with embodiments of the present invention. The aggregator receives information gathered by web request servers 125 (210). The information received from the web request servers may include user node reports from user community 110, information gathered by network crawlers 115 and information reported to community websites 120. The aggregator can also receive information from external data feeds 135(220). External data feed information can include, for example, externally derived reputation data and URLs gleaned from spam mail messages.

The received information is then aggregated and then analyzed to identify potential problem sites (230). As stated above, such analysis can include determining common problems reported by user nodes coupled with recent visitation to the same network site. In addition, such analysis can involve identifying URLs from spam messages and comparing those URLs to problem reporting from user nodes or web crawlers. Relative trustworthiness of an information source can also be taken into account by weighting the information received from that source. For example, information received from a network site reporting service may be given more weight than user reports provided by a community website.

Once potential problem sites have been identified, the aggregator can acquire historical information, if any, related to the identified sites (240). Historical information can be provided by database 140 and can include information such as ratings derived by analysis engines 150(1)-(n), a timestamp associated with such ratings information, and information related to any reporting associated with the identified site subsequent to the last analysis.

In light of the acquired new information and the historical information related to the identified site, the aggregator can calculate a probability that a rating of the identified site will change in light of the new information (250). This calculation can include an analysis not only of the identified site, but also all pages comprising that site and an aggregation of the results related to those pages. This probability calculation can be performed using a statistical analysis using calculation using, for example, Bayesian statistics. Using the calculated probability that the identified site's rating will change, the expected utility change in light of analysis can be calculated (260). An evaluation is then made to determine whether the expected utility change is sufficient to warrant scheduling the identified network site for additional analysis (270). This determination can be made in light of the availability of analysis resources as well as the level of expected utility change compared to that of other identified sites. Alternatively, a determination can be made as to whether the expected utility change exceeds a predetermined threshold that is set in light of parameters such as the availability of analysis resources. If the aggregator determines that the expected utility change is indeed sufficient, then the identified network site is scheduled for analysis (280).

Once identified sites have been analyzed, the ratings information generated is stored in database 140 of FIG. 1. This information can then be made available to users in user community 110. For example, if a user node desires to visit a network site, the node can request ratings information related to that site from web request servers 125. Web request servers 125 can then access the ratings information, if any, from database 140 and provide that information to the requesting user node. The user can then decide whether or not to visit the network site in light of the provided ratings information. In this manner, the user node can be protected from malware associated with the network site, if any, before exposing the network node to that malware. This level of protection goes beyond that provided by current specific immunity type antivirus methods.

Current computer security options function like a specific immunity system in a biological organism. Similar to biological antibodies, current systems use virus signatures that are tied to specifically identified malware. These signatures become permanently attached to a list of such signatures for the antivirus software. Subsequently, when a previously identified malware infects a computer, such an infection is recognized by generating a signature for that malware and comparing the signature to those in the signature file and a cleaning methodology is implemented. But these specific immunity methods cannot give protection against malware that is not specifically targeted. Embodiments of the present invention give a broader scope of protection than that offered by specific immunity systems. The user community provides potentially millions of sensors that are distributed around the world capable of identifying known infections as well as sending reports about non-specific suspicious activities (e.g., high CPU usage and increased network traffic). The non-specific information, in particular, gives an indicia of a potential new type of attack. Further, such information can be provided to the web request servers in a relatively quick manner, and if these non-specific activities are correlated across many users, a network site can be analyzed for malware generating these suspicious activities. If new malware is discovered by such analysis, a new signature can be generated related to the newly-discovered malware and subsequently distributed to the user community, thereby providing a new specific immunity for that malware. In the meantime, however, the associated network site can be rated as "bad" and when subsequent nodes request ratings information related to that network site, this rating information can be provided in order to discourage a user from visiting that site. Thus, embodiments of the present invention can provide two levels of security for nodes in the user community.

Figure 3:
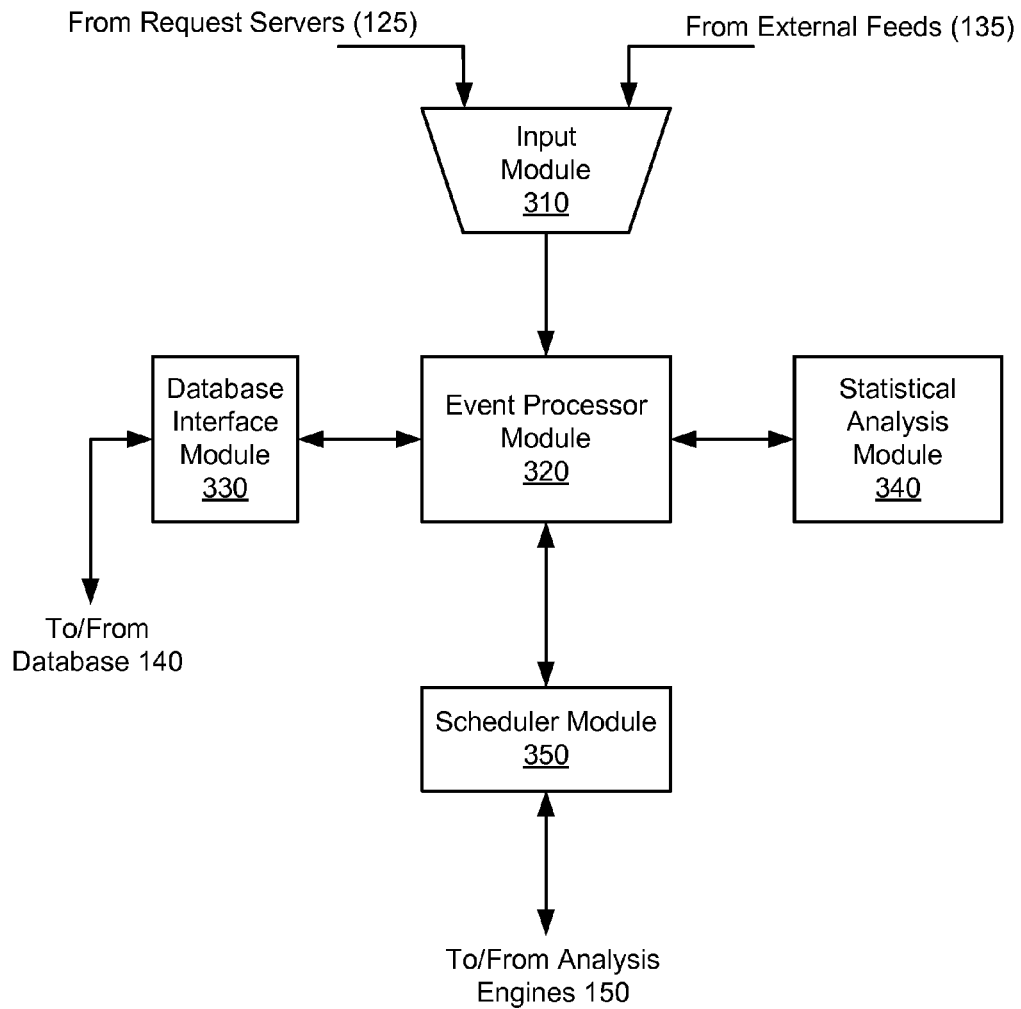
FIG. 3 is a simplified block diagram of modules that are included in an aggregator in accord with embodiments of the present invention.

FIG. 3 is a simplified block diagram of modules that are included in aggregator 130 in accord with embodiments of the present invention. Input module 310 is configured to receive information from request servers 125 and external feeds 135 and to provide that information to event processor 320. The input module can queue the received information and provide that information in a fair manner to the event processor.

Event processor 320 receives the information provided by input module 310 and performs initial analysis on that information prior to sending the information to statistical analysis module 340 for further processing. For example, the event processor can determine whether a network site has received over a predetermined threshold of reports, either positive or negative, to warrant statistical analysis. Alternatively, information from a highly weighted sources, such as a trusted site may have arrived (e.g., from an external feed) and therefore should be considered for that report's potential effect on utility. In addition, the event processor can receive analysis results from the scheduler module, which can then be provided to the statistical analysis module in order to determine whether higher level analysis is implicated.

Once event processor 320 determines those sites that will be examined by statistical analysis module 340, the event processor then provides a request for historical data related to that site from database 140 via database interface module 330. The database interface module not only sends requests to the database and receives responsive information from the database, but the database interface module can also provide the received historical data to the event processor in a form convenient for processing by the event processor. The event processor then provides both the newly arrived information from the input module as well as the historical information requested and received from the database to the statistical analysis module for further processing.

Statistical analysis module 340 analyzes the provided data for a particular site in order to determine whether a probable change in utility associated with further analysis of the site is warranted, as discussed above. Upon determining whether a site should be subjected to additional analysis, statistical analysis module 340 provides an indication of the results to event processor 320 to act in accord with that determination (e.g., provide the necessary information to scheduler module for the analysis engines). Embodiments of the present invention can also provide for the statistical analysis module to change a suspect site's rating immediately (e.g., a trustworthy source indicates that a previously good site has gone bad). In such an event, statistical analysis module 340 can not only indicate that the site should be subject to further analysis by the analysis engines 150, but also can indicate to the event processor that the rating associated with that site in database 140 should be updated.

When a site is identified as requiring further analysis by analysis engines 150, event processor 320 then provides information related to that site to scheduler module 350. As discussed above, the scheduler module can be found in a separate scheduler 145 or can be incorporated as a module within aggregator 130. Typical information provided to the scheduler module can include a network identifier of the suspect network site (e.g., a URL), an indication of the level of analysis required, and any additional information necessary to that analysis. Scheduler module 350 can include a set of queues each of which corresponding to a coupled analysis engines 150(*a*)-(*n*) and logic to determine which queue and where in that queue a newly arrived request should be inserted.

Scheduler module 350 can also be configured to receive analysis results and to provide those results to event processor 320. Alternatively, event processor 320 can be configured to directly receive analysis results from analysis engines 150. The event processor can then provide the analysis results to database interface module 330 for recording in database 140. The event processor can also provide the results to the statistical analysis module for a determination as to whether additional analysis is necessary.

Through the use of information provided by the user community, and analyzing that information in the aggregate of nodes reporting problems, embodiments of the present invention can provide ratings information related to network sites that is responsive to freshly acquire information. Further, by performing a statistical analysis related to the expected change in utility to the user community of conducting analysis of a site, embodiments of the present invention conserve available analysis resources.

An Example Computing and Network Environment

As shown above, the present invention can be implemented using a variety of computer systems and networks. An example of one such computing and network environment is described below with reference to FIGS. 4 and 5.

Figure 4:
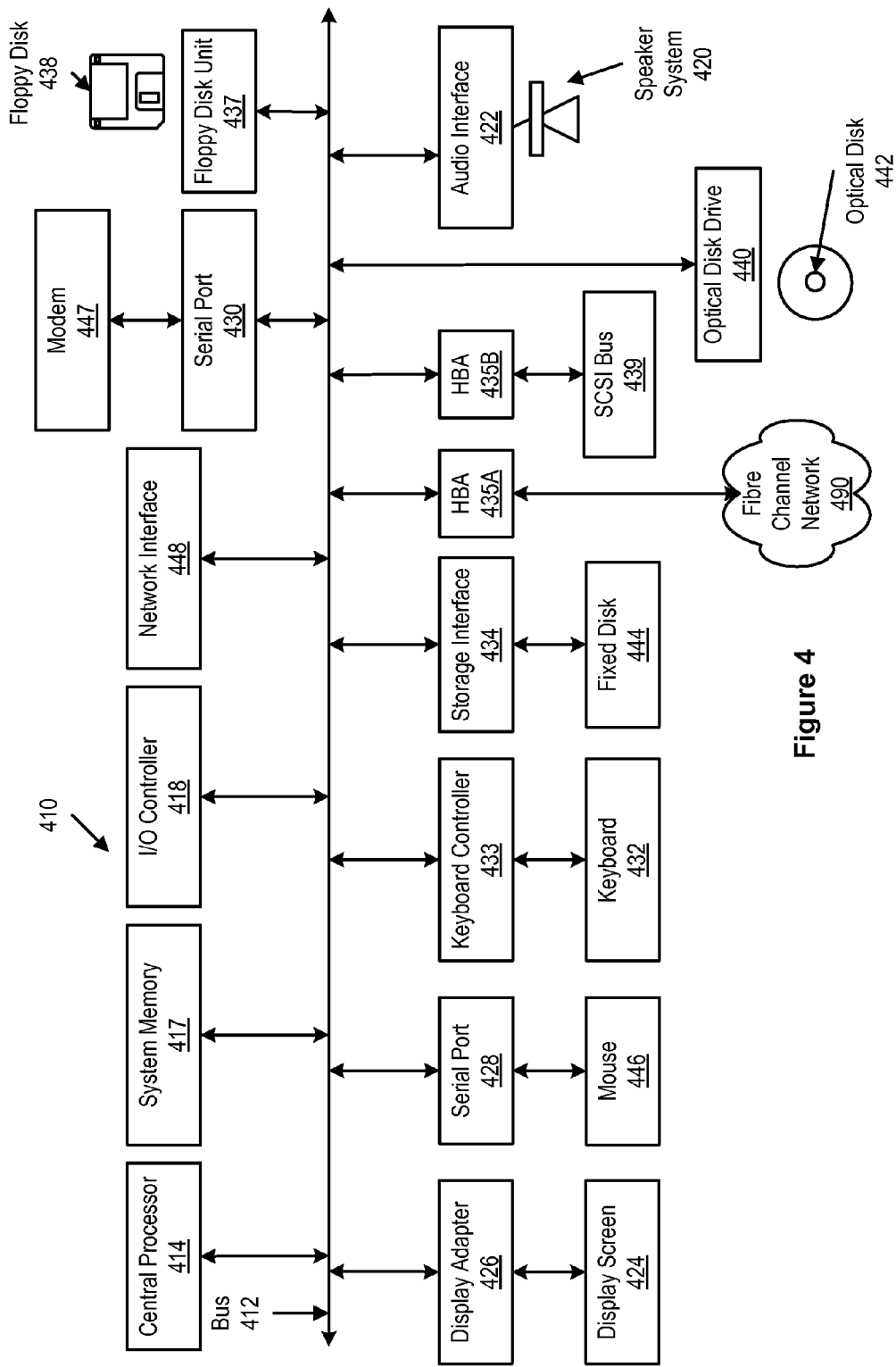
FIG. 4 depicts a block diagram of a computer system suitable for implementing embodiments of the present invention.

FIG. 4 depicts a block diagram of a computer system 410 suitable for implementing the present invention. Computer system 410 includes a bus 412 which interconnects major subsystems of computer system 410, such as a central processor 414, a system memory 417 (typically RAM, but which may also include ROM, flash RAM, or the like), an input/output controller 418, an external audio device, such as a speaker system 420 via an audio output interface 422, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440 operative to receive an optical disk 442. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), a floppy disk unit 437, or other storage medium. Additionally, applications can be in the form of electronic signals modulated in accordance with the application and data communication technology when accessed via network modem 447 or interface 448.

Storage interface 434, as with the other storage interfaces of computer system 410, can connect to a standard computer readable medium for storage and/or retrieval of information, such as a fixed disk drive 444. Fixed disk drive 444 may be a part of computer system 410 or may be separate and accessed through other interface systems. Modem 447 may provide a direct connection to a remote server via a telephone link or to the Internet via an internet service provider (ISP). Network interface 448 may provide a direct connection to a remote server via a direct network link to the Internet via a POP (point of presence). Network interface 448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 4 need not be present to practice the present invention. The devices and subsystems can be interconnected in different ways from that shown in FIG. 4. The operation of a computer system such as that shown in FIG. 4 is readily known in the art and is not discussed in detail in this application. Code to implement the present invention can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 5:
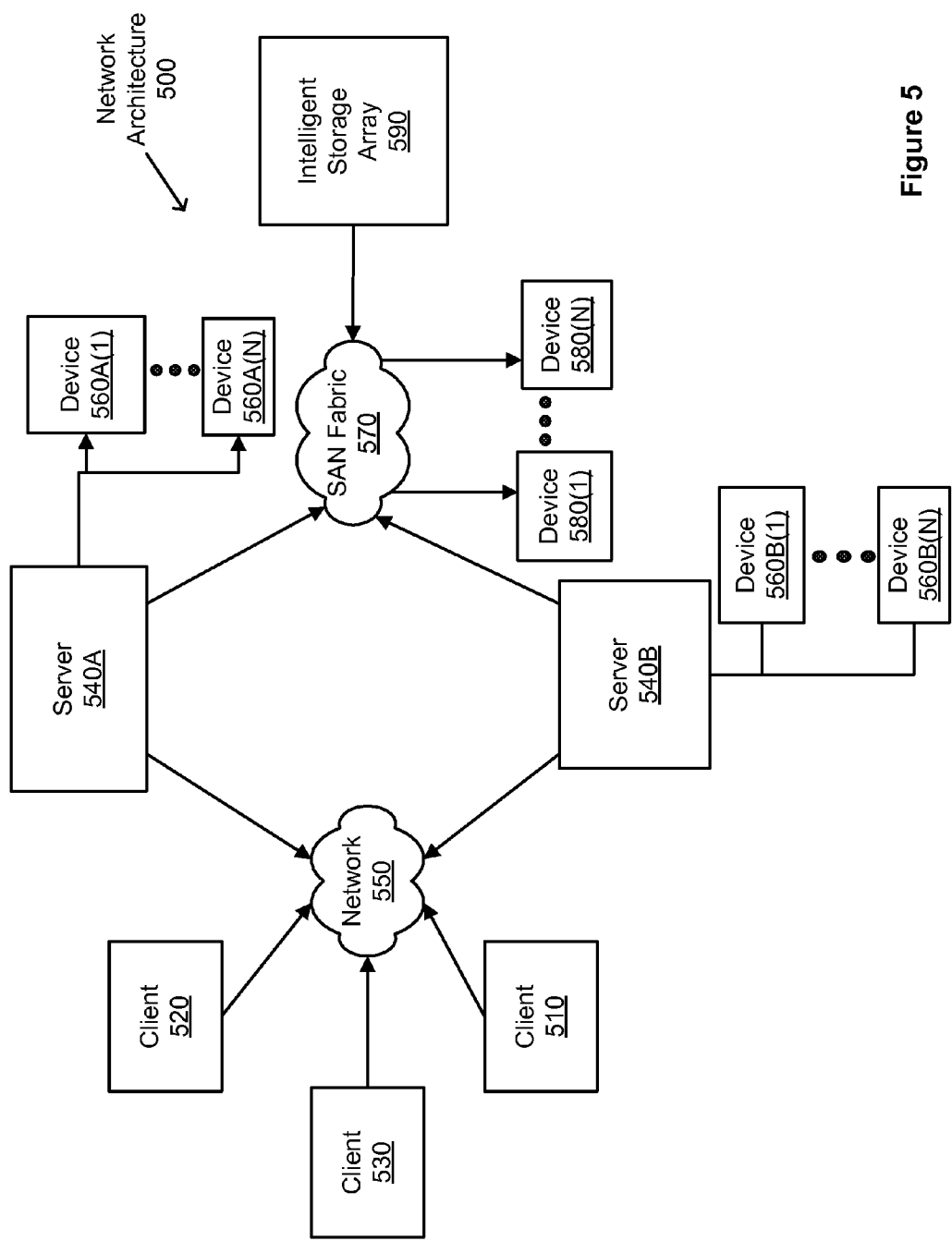
FIG. 5 is a block diagram depicting a network architecture suitable for implementing embodiments of the present invention.

FIG. 5 is a block diagram depicting a network architecture 500 in which client systems 510, 520 and 530, as well as storage servers 540A and 540B (any of which can be implemented using computer system 410), are coupled to a network 550. Storage server 540A is further depicted as having storage devices 560A(1)-(N) directly attached, and storage server 540B is depicted with storage devices 560B(1)-(N) directly attached. Storage servers 540A and 540B are also connected to a SAN fabric 570, although connection to a storage area network is not required for operation of the invention. SAN fabric 570 supports access to storage devices 580(1)-(N) by storage servers 540A and 540B, and so by client systems 510, 520 and 530 via network 550. Intelligent storage array 590 is also shown as an example of a specific storage device accessible via SAN fabric 570.

With reference to computer system 410, modem 447, network interface 448 or some other method can be used to provide connectivity from each of client computer systems 510, 520 and 530 to network 550. Client systems 510, 520 and 530 are able to access information on storage server 540A or 540B using, for example, a web browser or other client software (not shown). Such a client allows client systems 510, 520 and 530 to access data hosted by storage server 540A or 540B or one of storage devices 560A(1)-(N), 560B(1)-(N), 580(1)-(N) or intelligent storage array 590. FIG. 5 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 410). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving information, wherein
the information is related to a plurality of network sites;
identifying a suspect network site of the plurality of network sites, wherein
the identifying is based on the information,
the information comprises a safety rating for the suspect network site, and
the safety rating for the suspect network site is determined prior to the identifying;
determining, using one or more processors, a probability that the safety rating for the suspect network site will change due to a security analysis of the suspect network site, wherein
the determining is based, at least in part, on
the safety rating for the suspect network site, and
a portion of the information, wherein
the portion of the information is associated with the suspect network site, and
performance of the security analysis of the suspect network site depends on a determination of the probability.

2. The method of claim 1, further comprising:
responsive to the determination of the probability that the safety rating for the suspect network site will change, scheduling the security analysis for the suspect network site.

3. The method of claim 1, further comprising:
receiving a result from the security analysis, wherein
the safety rating for the suspect network site is configured to be changed using the result.

4. The method of claim 1, further comprising:
storing a result provided by the security analysis as a safety rating for the suspect network site.

5. The method of claim 1, wherein the receiving the information comprises:
receiving the information from a plurality of network nodes, wherein
the information comprises, for each of the plurality of network nodes, one or more of
a history of network sites recently visited by the each respective network node, or
a result of a security scan of the each respective network node, wherein
the result is configured to indicate a presence of malicious software.

6. The method of claim 5, wherein
the result of the security scan of the network node comprises
an indication of one or more dynamic performance parameters associated with the each respective network node.

7. The method of claim 1, wherein the identifying the suspect network site comprises one or more of
analyzing security scans from the plurality of network nodes, wherein
the analyzing the security scans is configured to identify a presence of a malicious software in a first subset of the plurality of network nodes,
analyzing a history of network sites recently visited by each network node of the
first subset of the plurality of network nodes, wherein
the analyzing the history is configured to identify a site visited by a
plurality of the first subset of the purality of network nodes, or
identifying the suspect network site as the site that is visited by a plurality of the first subset of the plurality of network nodes.

8. The method of claim 1, wherein
the information is received from one or more sources,
the one or more sources comprises
one or more trusted sources, and
one or more untrusted sources, and
the identifying the suspect network site further comprises
aggregating information from the one or more untrusted sources, and
applying a greater weight to a subset of the information that is received from the trusted sources.

9. The method of claim 8, wherein
the identifying the suspect network site further comprises
aggregating information from the one or more untrusted sources, and
applying a greater weight to a subset of the information that is received from the trusted sources.

10. The method of claim 1, wherein
the determining the probability comprises
calculating a decayed safety rating indicative of a decay in an accuracy of the safety rating, wherein
the decay in the accuracy is dependent on a time period since the safety rating was calculated; and
calculating the probability based on a statistical analysis of
the information, and
the decayed safety rating.

11. The method of claim 10, wherein
the statistical analysis comprises a Bayesian analysis.

12. That method of claim 1, further comprising:
calculating an expected change in utility to a user of the safety rating for the suspect network site, wherein
the calculating the expected change is based on the probability; and
scheduling the security analysis for the suspect network site if the expected change in utility exceeds a predetermined threshold.

13. An apparatus comprising:
at least one processor;
an input module configured to receive information, wherein
the information is related to safety of one or more network sites;
an event processor module, coupled to the input module, and configured to be executed by the at least one processor to:
identify a suspect network site of the one or more network sites, wherein
the event processor is configured to perform the identification using the information,
the information comprises a safety rating for the suspect network site, and
the safety rating for the suspect network site is determined prior to the event processor performing the identification, and
submit the suspect network site to a scheduler module for security analysis, wherein
the event processor is configured to perform the submitting depending on a determination of the probability; and
a statistical analysis module, coupled to the event processor module, and configured to determine the probability that the safety rating for the suspect network site will change due to a security analysis of the suspect network site, wherein the statistical analysis module is configured to perform
the determining based, at least in part, on
the safety rating, and
a portion of the information, wherein
the portion of the information is associated with the
suspect network site.

14. The apparatus of claim 13, further comprising:
the scheduler module, coupled to the event processor module, and to one or more security analysis engines, and configured to
queue the suspect network site for security analysis, wherein
a selected one of the one or more security analysis engines is configured to perform the security analysis to provide a result.

15. The apparatus of claim 14, further comprising:
a database interface module, coupled to the event processor module, and configured to provide the safety rating to a database for storage, wherein
the safety rating is configured to be changed using the result.

16. The apparatus of claim 13, wherein
the input module is configured to receive the information from a plurality of network nodes, and
the information comprises, for each of the plurality of network nodes, one or more of a history of network sites recently visited by the each respective network node, or a result of a security scan of the each respective network node, wherein
the result is configured to indicate a presence of malicious software.

17. A non-transitory computer-readable storage medium comprising:
a first set of instructions, executable by a processor, configured to receive information, wherein
the information is related to a plurality of network sites;
a second set of instructions, executable by the processor, configured to identify a suspect network site of the one or more network sites, wherein
the identifying is based on the information,
the information comprises a safety rating for the suspect network site, and
the safety rating for the suspect network site is determined prior to the identifying, and
a third set of instructions, executable by the processor, configured to determine a probability that the safety rating for the suspect network site will change due to a security analysis of the suspect network site, wherein
the determining is based, at least in part, on
the safety rating for the suspect network site, and
a portion of the information, wherein
the portion of the information is associated with the suspect network site, and
performance of the security analysis of the suspect network site depends on a determination of the probability.

18. The non-transitory computer-readable storage medium of claim 17, further comprising:
a fourth set of instructions, executable by the processor, configured to, in response to the determination that the probability that the safety rating for the suspect network site will change, schedule the security analysis for the suspect network site.

19. The non-transitory computer-readable storage medium of claim 17, further comprising:
a fourth set of instructions, executable by the processor, configured to receive a result from the security analysis, wherein
the safety rating for the suspect network site is configured to be changed using the result.

20. The non-transitory computer-readable storage medium of claim 17, further comprising:
a fourth set of instructions, executable by the processor, configured to
receive the information from a plurality of network nodes, wherein
the information comprises, for each of the plurality of network nodes, one or more of
a history of network sites recently visited by the each respective network node, or
a result of a security scan of the each respective network node, wherein
the result is configured to indicate a presence of malicious software.

* * * * *